(12) United States Patent  
Kodama (10) Patent No.: US 6,433,809 B1  
(45) Date of Patent: Aug. 13, 2002

(54) METHOD OF CONTROLLING LIGHT INTENSITY IN IMAGE EXPOSURE APPARATUS

(75) Inventor: Kenichi Kodama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/492,769

(22) Filed: Jan. 27, 2000

(30) Foreign Application Priority Data

Jan. 25, 1999 (JP) .......................................... 11-016084

(51) Int. Cl.[7] ............................. B41J 2/455; B41J 2/435
(52) U.S. Cl. ....................................... 347/233; 347/234
(58) Field of Search ................................ 347/132, 233, 347/234, 246, 248, 237, 236, 238

(56) References Cited

U.S. PATENT DOCUMENTS

| | | | | |
|---|---|---|---|---|
| 5,057,851 A | * | 10/1991 | Hattori | 347/246 |
| 5,412,408 A | * | 5/1995 | Itoh et al. | 347/132 |
| 5,471,236 A | * | 11/1995 | Ito | 347/233 |

FOREIGN PATENT DOCUMENTS

| | | | | |
|---|---|---|---|---|
| JP | 7-248543 | * | 9/1995 | G03B/27/52 |
| JP | 8-12335 | | 2/1996 | G02B/26/10 |

* cited by examiner

Primary Examiner—Hai Pham  
(74) Attorney, Agent, or Firm—Sughrue Mion, PLLC (57) ABSTRACT

In a controller for controlling a light intensity of an LED, errors in a feed amount in a sub-scanning direction are stored in advance in the form of a table. For example, in a third main scanning, in a case in which a feed amount thereof becomes slightly large and there is an interval larger than a predetermined line interval L between a beam at a final end in the sub-scanning direction in a first main scanning and a beam at a starting end in the sub-scanning direction in the third main scanning, the controller controls the intensity of light of the LED when second main scanning is carried out such that an intensity of light of a third beam in the sub-scanning direction in the second main scanning, which is situated at this portion, is increased. As a result, local reduction in a light intensity distribution is eliminated on the whole, there making it possible to obtain a uniform light intensity distribution.

32 Claims, 8 Drawing Sheets

METHOD OF CONTROLLING LIGHT INTENSITY IN IMAGE EXPOSURE APPARATUS

BACKGROUND OF THE INVENTION

1. Field of the Invention

The present invention relates to a method of controlling a light intensity in an image exposure apparatus, and more specifically, to a method of controlling a light intensity in an image exposure apparatus that carries out what is called "exposure using comb light beam spots".

2. Description of the Related Art

Currently, there are types of image exposure apparatus that expose an image onto an exposure surface by what is called "exposure using comb light beam spots" (see Japanese Patent Application Publication (JP-B) No. 8-12335 and the like). In an image exposure apparatus by the exposure using comb light beam spots, the positions of light sources are set in advance such that the intervals, in the sub-scanning direction, between beams of light which are exposed by one main scan are each an integer multiple of the intervals between main scanning lines (intervals in the sub-scanning direction) of an image formed on an exposure surface. Then, in the first main scan, main scanning lines are main-scanned at fixed intervals. By carrying out sub-scanning at a predetermined feed amount and then carrying out the next main scan, main scanning lines of the second time or times thereafter are subsequently placed between the first main scanning lines. (In JP-B No. 8-12335, such an exposure method is referred to as an "overlapping mode".) By carrying out the main scanning a plurality of times together with the sub scanning at the predetermined feed amount in the manner described above, the final main scanning lines are structured so as to form the final image.

In carrying out the exposure using comb light beam spots described above, the feed amounts in the sub-scanning direction must be precisely identical in each sub-scan. Otherwise, certain main scanning lines approach each other such that the entire intensity of light at that portion is increased, or conversely, certain main scanning lines move away from each other such that the entire intensity of light at that portion is decreased. As a result, the light intensity distribution becomes non-uniform.

However, it is difficult to make the feed amounts in the sub-scanning direction precisely identical. Further, depending on the configuration of the expose surface and the like, even when the feed amounts in the sub-scanning direction are made precisely identical, there may be cases in which the intervals between the main scanning lines on some parts of the exposure surface are not constant.

SUMMARY OF THE INVENTION

In view of the aforementioned, an object of the present invention is to obtain a method of controlling a light intensity in an image exposure apparatus in which a high-precision image can be exposed by reducing nonuniformity in intensity of light even when there is an error in a feed amount in a sub-scanning direction in an image exposure apparatus that utilizes exposure using comb light beam spots.

In a first aspect of the present invention, there is provided a method of controlling a light intensity in an image exposure apparatus which includes: light sources of a number m which emit light in accordance with image information, the light sources being aligned along a fixed direction so as to be disposed at intervals which are n times a line interval L which is a line interval between main scanning lines on an exposure surface, n being a natural number; and scanning means for carrying out main scanning by relatively moving the m light sources with respect to the exposure surface in a direction perpendicular to the direction in which the light sources are arranged, and for carrying out sub-scanning by relatively moving the m light sources with respect to the exposure surface in the direction in which the light sources are arranged by a feed amount of (L×m), the method comprising the step of: in a case in which an interval between specific main scanning lines is made larger or smaller than the line interval L due to an error in a feed amount in the sub-scanning direction, when another main scanning is carried out, controlling the intensity of light of a light source, among the m light sources, which corresponds to the portion in which the interval between the main scanning lines is made larger or smaller.

With the structure described above, according to the first aspect of the present invention, so-called exposure using comb light beam spots can be carried out. Namely, although there are intervals of (L×n) between a plurality of main scanning lines that are formed by one main scanning, the intervals are filled in by carrying out sub-scanning at the feed amount of (L×m) and further carrying out the next main scanning. By carrying out the above operation "n" times, main scanning lines are ultimately formed at fixed line intervals L so that an image is exposed. Since, in the method of controlling a light intensity in an image exposure apparatus of the first aspect, m and n are relatively prime and m>n≧2, the main scanning lines do not overlap each other and the lines to be main-scanned are men-scanned without fail.

When there is an error in a feed amount in the sub-scanning direction, specific mail scanning lines approach or move away from each other. However the intensity of light of a light source, which corresponds to the portion at which the specific main scanning lines approach or move away from each other, is controlled when another sub-scanning is carried out. Accordingly, when exposure of the entire exposure surface is completed, nonuniformity in the intensity of light in the sub-scanning direction is eliminated, thereby allowing a high-precision image to be obtained.

According to a second aspect of the present invention, in the method of controlling a light intensity in an image exposure apparatus of the first aspect, m and n are relatively prime and are set so as to satisfy the relation m, n≧2.

The condition of main scan is thus set in the manner described above, and therefore, the main scanning lines do not overlap each other and the lines to be main-scanned are main-scanned without fail. Accordingly, main scanning of a desired main scanning line can reliably be carried out.

In a third aspect of the present invention, there is provided a method of controlling a light intensity in an image exposure apparatus which includes: light sources of a number m which emit light in accordance with image information, the light sources being aligned along a fixed direction so as to be disposed at intervals which are n times a line interval L which is a line interval between main scanning lines on an exposure surface, n being a natural number; and scanning means for carrying out main scanning by relatively moving the m light sources with respect to the exposure surface in a direction perpendicular to the direction in which the light sources are arranged, and for carrying out sub-scanning by relatively moving the m light sources with respect to the exposure surface in the direction in which the light sources are arranged by a feed amount of (L×(m−a)), (a is a natural number), m and n being not relatively prime and (m−a) and n being relatively prime, and satisfying the relation (m−a) ≧(m×n)/2, the method comprising the step of: in a case in which an interval between specific main scanning lines is made larger or smaller than the line interval L due to an error in a feed amount in the sub-scanning direction, when another main scanning is carried out, controlling the intensity of light of a light source, among the m light sources, which corresponds to the portion in which the interval between the main scanning lines is made larger or smaller.

With the structure described above, according to the third aspect of the present invention, so-called exposure using comb light beam spots can be carries out. In other words, there are intervals of (L×n) between plural main scanning lines which are formed by one main scanning, and the intervals are filled in by carrying out sub-scanning at the feed amount of (L×(m−a)) and further carrying out the next main scanning. By carrying out the above operation "n" times, main scanning lines are ultimately formed at fixed line intervals L so that an image is exposed.

When there is an error n a feed amount in the sub-scanning direction, specific main scanning lines approach or move away from each other. However, the intensity of light of a light source, which corresponds to the portion at which the specific main scanning lines approach or move away from each other, is controlled when another sub-scanning is carried out. Accordingly, when exposure of the entire exposure surface is completed, nonuniformity in the intensity of light in the sub-scanning direction is eliminated, thereby allowing a high-precision image to be obtained.

In the first to third aspects of the present invention, a specific structure for eliminating nonuniformity in intensity of light which is caused by an error in a feed amount in the sub-scanning direction is shown. For example, there are cases, as shown in a fourth aspect of the present invention, in which specific main scanning lines approach each other due to the error. In such cases, since the intensity of light increases between the main scanning lines that approach each other, when another main scanning is carried out (i.e., when this position is main-scanned), the intensity of light of the corresponding light source is decreased.

In contrast, there are also cases, as shown in a fifth aspect of the present invention, in which specific main scanning lines move away from each other due to the error. In such cases, since the intensity of light decreases between the main scanning lines that move away from each other, when another main scanning is carried out (i.e., when this posit on is main-scanned), the intensity of light of the corresponding light source is increased.

In a sixth aspect of the present invention, in any of the first to fifth aspects, the image exposure apparatus comprises a memory in which the error is stored in advance in correspondence with the exposure surface, and on the basis of the error that is stored in the memory, the intensity of light of a specific light source of the m light sources is controlled when sub-scanning is carried out.

In this way, errors are stored in advance in the storing means of the image exposure device, and the light intensity of the specific light source is controlled on the basis of the error. Thus, control of the light intensity is facilitated.

DESCRIPTION OF THE PREFERRED EMBODIMENTS

Figure 1:
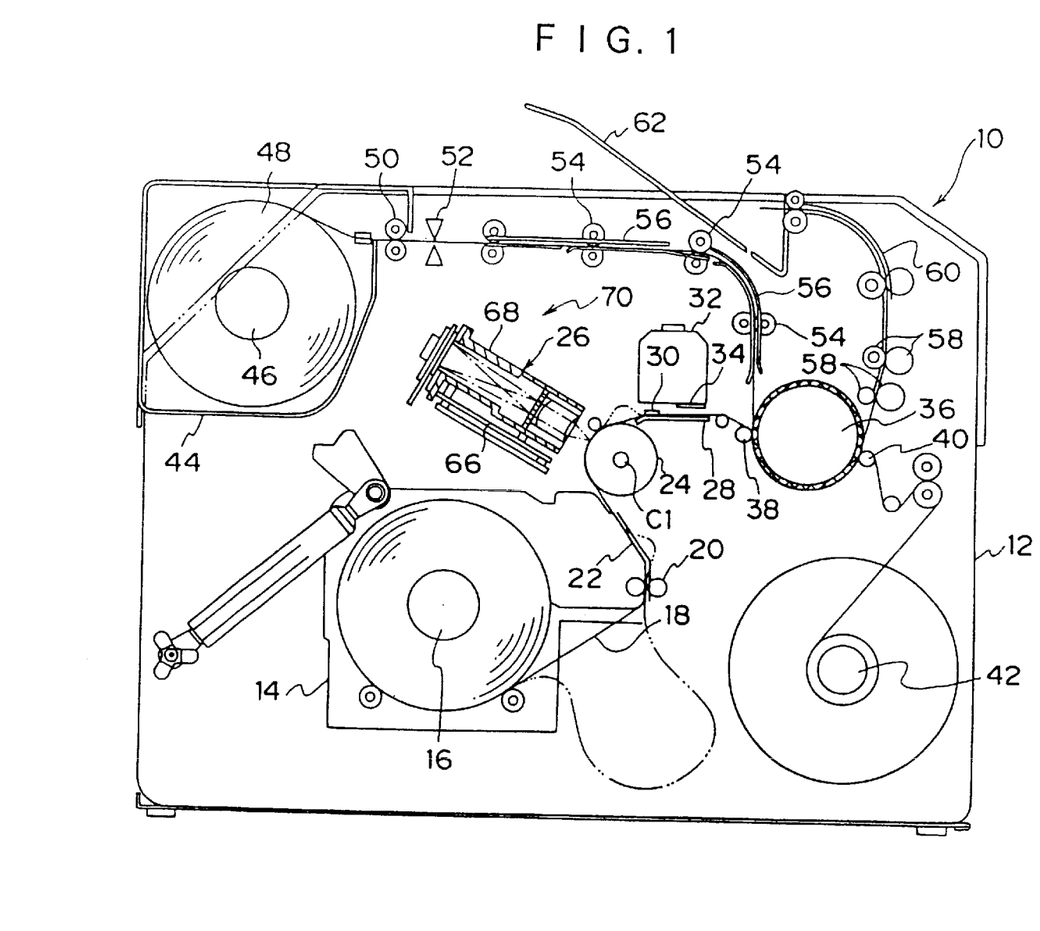
FIG. 1 is a schematic structural view illustrating an image forming apparatus that includes an image exposure apparatus according to a first embodiment of the present invention.
Figure 2:
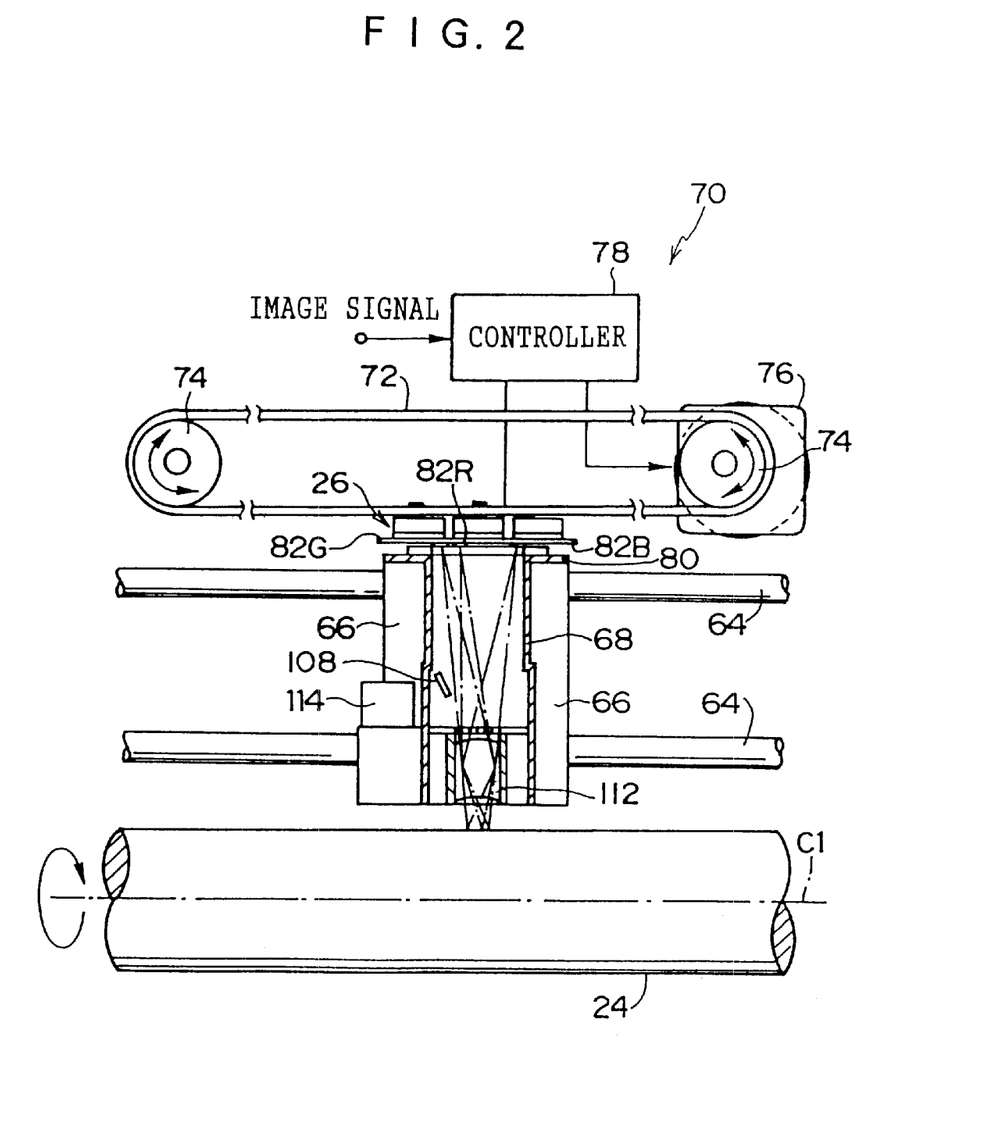
FIG. 2 is a schematic structural view illustrating the image exposure apparatus according to the first embodiment of the present invention.

FIG. 2 illustrates a schematic structure of an image exposure apparatus 70 in accordance with a first embodiment of the present invention. Further, FIG. 1 illustrates a schematic structure of an image forming apparatus 10 that includes the image exposure apparatus 70.

As shown in FIG. 1, a photosensitive material magazine 14 is disposed in a housing 12 of the image forming apparatus 10. A feed reel 16 is fitted into the photosensitive material magazine 14 in such a manner as to be rotatable and removable. A photosensitive material 18 is set at the feed reel 16 in a state in which the photosensitive material 18 is wound up, and when the feed reel 16 is rotated by a driving means (not shown), the photosensitive material 18 is pulled out.

The leading end of the photosensitive material 18 is nipped by pull-out rollers 20 provided in the vicinity of a discharge opening of the photosensitive material magazine 14. Under predetermined conditions, the pull-up rollers 20 pull out the photosensitive material 13 and feed the photosensitive material 18 to a guide plate 22, and form a buffer in the photosensitive material 18 (a slack portion of the photosensitive material 18 illustrated by a two-dot chain line).

The photosensitive material 18 that has passed the guide plate 22 is trained onto an exposure drum 24, and an image is exposed onto the photosensitive material 18 by an exposure head 26. The exposure drum 24 is cylindrical, and the exposure surface (circumferential surface) thereof has a fixed curvature around a rotating shaft C1. By exposing the photosensitive material 18 while the photosensitive material 18 is trained on the exposure drum 24, the occurrence of wrinkles and the like in the transverse direction of the photosensitive material 18 is prevented, thereby ensured a certain flatness of the photosensitive material 18. Further, by moving the photosensitive material 18 in the longitudinal direction thereof along the surface of the expose drum 24, sub-scanning is carried out.

The photosensitive material 18 onto which the image has been exposed is nipped between a supporting stand 28 and a pressing plate 30 and is fed below an applying tank 32. An applying member 34 formed of a highly water-absorptive material such as a sponge or the like is provided at the applying tank 32. Water is applied to the photosensitive material 18 by the applying member 34.

The photosensitive material 18 coated with water is trained onto a heat drum 36, which includes a built-in heating means such as a halogen lamp or the like, at a fixed pressure by tension rollers 38 and 40. While being heated, the trained photosensitive material 18 is overlapped with an image receiving paper 48, which will be described later, such that the image is transferred onto the image receiving paper 48.

The photosensitive material 18 whose image has been transferred onto the image receiving paper 48 is wound up onto a disposal reel 42. By delivering the photosensitive material 18 as described above from the feed reel 16 to the disposal reel 42 without cutting the photosensitive material 18, the photosensitive material 18 itself functions as a belt which imparts a fixed pressure to the image receiving paper 48.

In the housing 12, an image receiving paper magazine 44 is disposed above the photosensitive material magazine 14. A feed reel 46 is fitted into the image receiving paper magazine 44 in such a manner as to be rotatable and removable. The image receiving paper 48 is set at the feed reel 46 in a state in which the image receiving paper 48 is wound up. After being pulled out by nip rollers 50 and cut to a predetermined length by a cutter 52, the image receiving paper 48 is guided by feed rollers 54 and guide plates 56 and is trained onto the heat drum 36 while being overlapped with the photosensitive material 18.

Then, the image receiving paper 48 onto which the image has been transferred from the photosensitive material 18 is peeled off from the heat drum 36 by a peeling claw (not shown), and is guided by feed rollers 8 and a guide plate 60 and is discharged onto a receiving tray 62.

As shown in FIG. 2, above the exposure drum 24, two shafts 64 are disposed parallel to the rotating shaft C1 of the exposure drum 24. The shafts 64 are inserted into supporting holes that pass through a supporting block 66 so that the supporting block 66 can slide along the shafts 64.

A casing 68 of the exposure head 26 is fixed to the supporting block 66. An endless timing belt 72 is fixed to the casing 68 via,L connecting plate (not shown). The timing belt 72 is trained around sprockets 74 that are provide d in the vicinities of both ends of the shaft 64. Torque is transmitted from a stepping motor 76 to the sprockets 74 via a transmission, and due to forward rotation and reverse rotation of the stepping motor 76, the exposure head 26 is moved along the shafts 64 in a reciprocating manner.

The driving of the stepping motor 76 is controlled by a controller 78 in such a manner as to be synchronous with the step driving of the photosensitive material 18. In other words, in a state in which the photosensitive material 18 has been moved in a stepwise manner in the longitudinal direction thereof (i.e., the sub-scanning direction) and then stopped, the controller 78 causes the stepping motor 76 to rotate in the forward direction. As a result, the exposure head 26 begins forward direction operation along the shafts 64 and moves in the transverse direction of the photosensitive material 18 (i.e., the main scanning direction).

Then, after a predetermined number of pulses has been confirmed, and further, in a sat in which the photosensitive material 18 has moved in the sub-scanning direction in a stepwise manner and then stopped, the controller 78 causes the stepping motor 76 to rotate in reverse direction. As a result, the exposure head 26 starts reverse direction operation along the shafts 64 and moves in the transverse direction of the photosensitive material 18 (i.e., the main scanning direction).

At this point, the controller 78 effects control such that the feed amounts of the photosensitive material 18 in the sub-scanning direction are constant. However, for example, if the center of the exposure drum 24 is slightly eccentric or the surface of the exposure drum 24 has minute indentations, the feed amounts of the photosensitive material 18 may not be constant, and there may be a slight error in the feed amount. In consideration of the above, errors with respect to the rotational position of the exposure drum are stored quantitatively in advance as a correction table. Then, as will be described later, based on the stored data, the controller 78 controls the intensity of light of LED 98 such that e when there is an error in a feed amount of the photosensitive material 18 in the sub-scanning direction, nonuniformity in the light intensity distribution due to the error is not caused.

Figure 3:
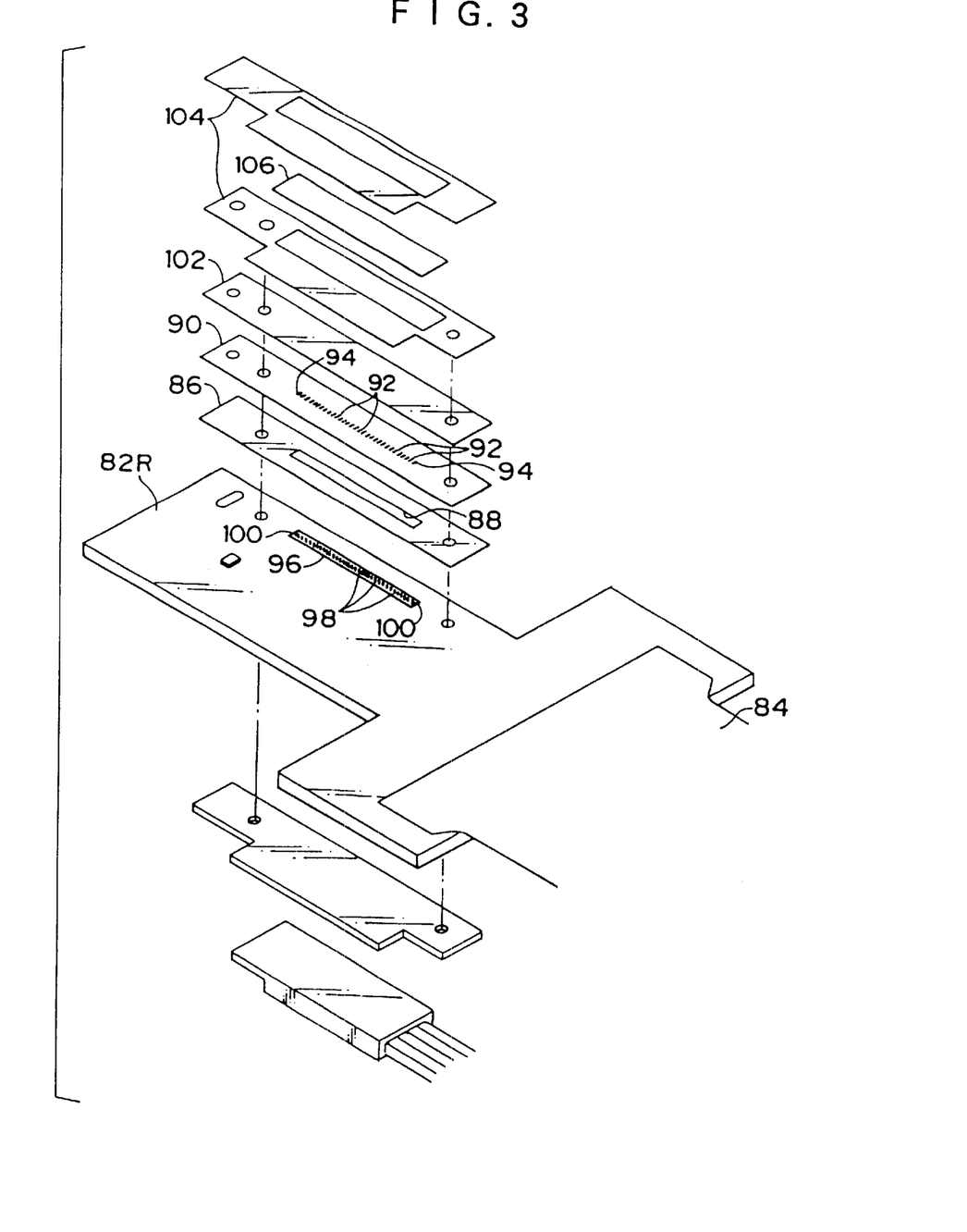
FIG. 3 is a schematic structural view illustrating an exposure head of the image exposure apparatus according to the first embodiment of the present invention.

As illustrated in FIG. 2, substrates 82 (82R, 82G and 82B) corresponding to the three colors of R, G and B are fixed on an upper plate 80 of the casing 6. As is also illustrated in FIG. 3, a flexible cable 84 of the controller 78 in which an image signal is stored is connected to each of the substrates 82R, 82G and 82B. Further, LED chips 96 (96R, 96G and 96B) that emit light according to the signal from the controller 78 are mounted on the substrates 82R, 82G and 82B, respectively. At the LED chips 96, a number m of LEDs 98 (wherein m≧3) corresponding to the substrates 82R, 82G, 82B are disposed linearly along the sub-scanning direction. (In the present embodiment, there are 31 red LEDs at the substrate 82R, 31 green LEDs at the substrate 82G, and 31 blue LEDs at the substrate 82B.) These LEDs 98 are lit in accordance with image signals. (In FIG. 3, for convenience of illustration, the substrate 82R is illustrated upside-down. Accordingly, in FIG. 3, the light of the LEDs 98 is illuminated upward in the figure.)

Figure 4:
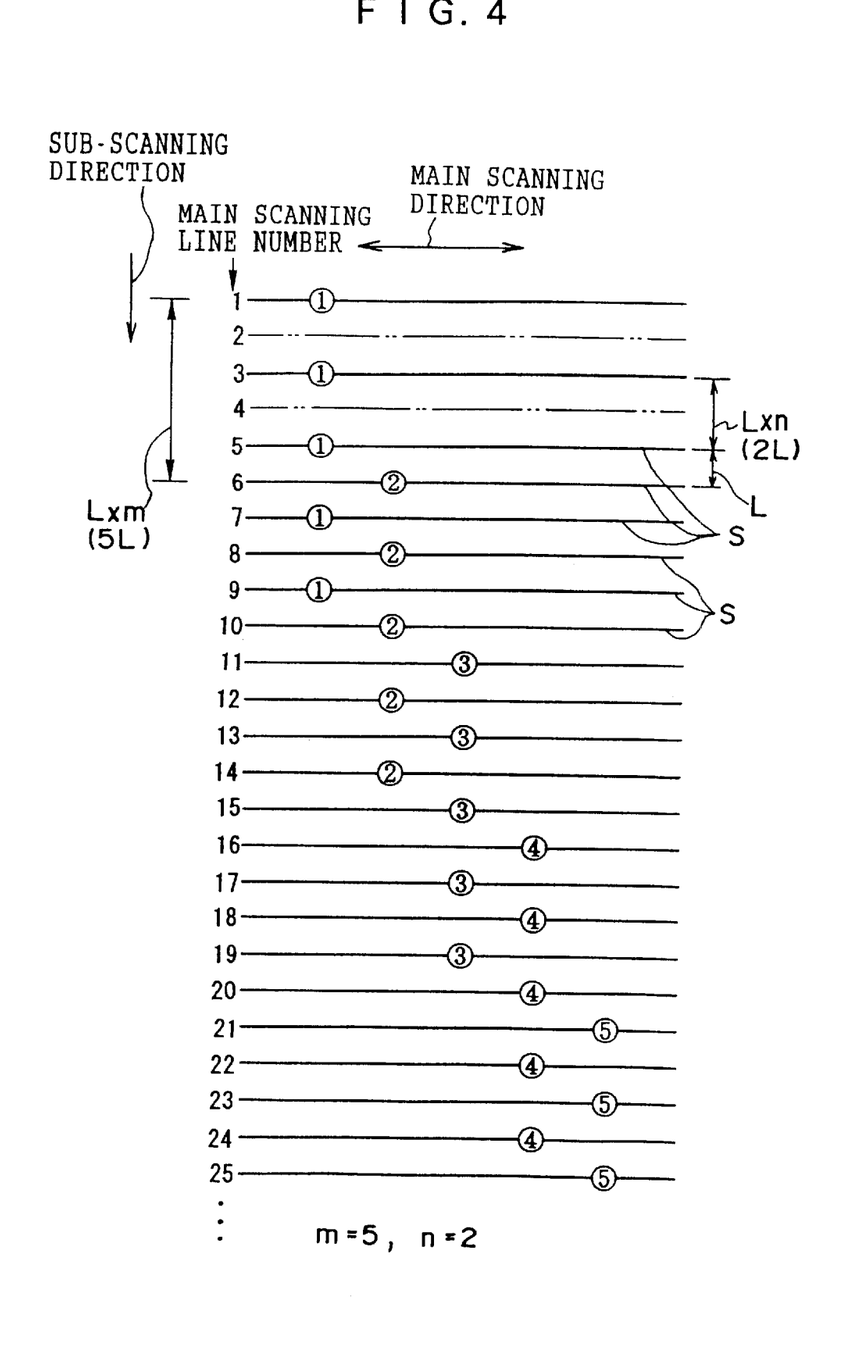
FIG. 4 is an explanatory view illustrating main scanning lines that are main-scanned by the image exposure apparatus according to the first embodiment of the present invention.

As shown in FIG. 4, the interval between the LEDs 98 is a predetermined interval such that the value thereof is a value (L×n) obtained by multiplying a line interval L between main scanning lines S of the image formed ultimately on the photosensitive material 18, by a predetermined natural number n. (Since the light from the LEDs 98 forms an image on the photosensitive material 18 at a predetermined magnification due to an imaging lens 112 which will be described later, the intervals between the LEDs 98 themselves do not generally correspond to L ×n.) Further, the natural number n and the number m of the LEDs 98 satisfy the relation >n≧2, and are relatively prime. (In FIG. 4, for convenience of illustration, the number of the LEDs 98, i.e., m, is 5, and the predetermined natural number, i.e., n, is 2. Additionally, main scanning lines that are formed by the first main scan are designated by (1).

As can be seen from FIG. 4, when main scanning is carried out only once, there are intervals (L×n) between the main scanning lines S indicated by (1). Then, after moving the photosensitive material 18 by L×m) in the sub-scanning direction, a second main scan is carried out, as shown by (2). By repeating the same operation times in the manner described above, main scanning lines S fixed line intervals L are successively obtained. A more specific description of this process is as follows, with reference to FIG. 4. In FIG. 4, n is 2. Thus, by the first main scan shown by (1), intervals 2L are formed between the main scanning line S. Since m is 5 in FIG. 4, the second main scan is carried out as shown by (2) after the photosensitive material 18 is moved by 5L in the sub-scanning direction. As a result, in the middle of the respective intervals of a length 2L that have been formed between the main scanning lines S formed by the first main scan, main scanning lines are formed by the second main, scanning lines are formed by the second main scan, and these second main scanning lines are also denoted by S. As a result in a region in which the first main scan and the second main scan are overlapped, intervals between the main scanning lines S become L. Then, with respect to third main scanning lines S (i.e., main scanning lines S formed by the third main scan), in the same manner as in the second main scan, the main scanning is carried out after the photosensitive material 18 is moved by 5L in the sub-scanning direction. As a result, in the respective interval of 2L that have been formed between the second main scan gin lines S, third main scanning lines S are formed, and intervals between the main scanning lines S become L in the region in which the main scans overlap. Thereafter, the above operation is repeated so as to form an image in which intervals between the main scanning lines S are L on the entire exposure surface.

In the manner described above, so-called exposure using comb light beam spots is carried out in the image exposure apparatus 70 according to the p resent embodiment. For this reason, even when there is irregularity in the positions of the main scanning lines S (particularly in the positions in the sub-scanning direction), the irregularity can be corrected on the whole. Accordingly, it is possible to form an image with even higher precision.

The substrate 82R illustrated in FIG. 3 is a substrate on which the R (red) LEDs 98 are mounted. Hereinafter, explanation will be given by using the substrate 82R as an example, but the basic structures (the members mounted to the substrates 82 and the like) of the substrates 82w, 82G and 82B are the same.

A protective frame 86 is fixed to the substrate 82R. An accommodating hole 88 corresponding to the LED chip 96 is formed in the protective frame 86. The thickness of the protective frame 86 is greater than a fixed portion (not shown) at which the LED chip 96 and the 78 are electrically connected. (In a case in which the LED chip 96 is fixed to the substrate 82R by bonding, the fixed portion is the portion built-up by the bonding.) Thus, this fixed portion is protected by the protective frame 86.

A slit plate 90 is fixed to the light illuminating side of the protective frame 86. Plural transmitting holes 92 corresponding to the plural LEDs 98 are formed in the slit plate 90. Generally, there is some variation in or offset of the positions at which the LEDs 98 are actually mounted to the substrate 82R. However, the precision of forming the transmitting holes 92 in the slit plate 90 (the accuracy of the positions at which the transmitting holes 92 are formed in the slit plate 90 and the accuracy of the configurations of the transmitting holes 92) can be much higher than the precision of mounting he LEDs 98 to the substrate 82R. Thus, due to the light of the LEDs 98 passing through the transmitting holes 92 of the slit plate 90, variation in or offset of the positions of the LEDs 98 is corrected, and lights (spot lights) of constant spot shapes are always emitted from correct positions. The region corresponding to the transmitting holes 92 substantially forms a light-emitting region of the LEDs 98.

The number of the transmitting holes 92 may be the same as the number of the LEDs 98, but it is preferable that auxiliary transmitting holes 94 of the same configuration as the transmitting holes 92 are formed at both ends in the direction in which the transmitting holes 92 are aligned (the sub-scanning direction). Namely, the light from one LED 98 passes not only through the transmitting hole 92 corresponding to that LED 98, but also, a portion of the light passes through the transmitting holes 92 at the sides of the corresponding transmitting hole 92 as well. Namely, the light which is emitted from one LED 98 and reaches the photosensitive material 18 is the light which passes through the corresponding transmitting hole 92 and the transmitting holes 92 at the sires thereof. If the auxiliary transmitting holes 94 are not provided, light cannot pass through the alignment direction outer sides of the transmitting holes 92 at the both ends, and thus, the intensity of light reaching the photosensitive material 18 at portions corresponding to the vicinities of the alignment direction ends is lower than at the other portions. However, by forming the auxiliary transmitting holes 94, light is transmitted through the auxiliary transmitting holes 94 at the alignment direction outer sides of the transmitting holes 92, and thus, a decrease in the intensity of light in the vicinities of the alignment direction ends can be prevented, and an intensity of light which is uniform overall can be obtained.

When the auxiliary transmitting holes 94 are formed, it is preferable to provide, at the LED chip 96, dummy light sources 100 which correspond to the auxiliary transmitting holes 94 and which are structured substantially the same as the LEDs 98 but which do not emit light. Namely, the light which is emitted from one LED 98 not only passes directly through the corresponding transmitting hole 92, but also, a portion thereof is reflected by other LEDs 98 or is transmitter through other LEDs 98, and thereafter, reaches the transmitting hole 92. Accordingly, by providing the dummy light sources 100, even with regard to the light passing through the auxiliary transmitting holes 94 as well, this light is reflected by or transmitted through the dummy light sources 100 which are formed substantially similarly to the LEDs 98, and can be set in a state which is similar to a state in which an existing light source (LED 98) were provided at the position of the dummy light source 100. Note that if light can be reflected or transmitted in the same way as with the LED 98 which is the existing light source, there is no need for the dummy light source 100 to have the same structure as the LED 98. For example, a semi-transparent mirror of a predetermined configuration or the like may be used.

It should be noted that the intervals between adjacent LEDs 98, the intervals bete the LEDs 98 and the dummy light sources 100, the shapes of the transmitting holes 92, the intervals between adjacent transmitting holes 92 and the intervals between the transmitting holes 92 and the auxiliary transmitting holes 94 can be, for example, the same shapes and the equal intervals (namely, predetermined intervals and shapes such that the interval between the main scanning is L×n on the photosensitive material 18). However, it is preferable that these shapes and intervals are predetermined shapes and predetermined intervals such that beams of light of the respective colors (imaged spot) are aligned on the exposure drum 24 at equal intervals.

Because the exposure drum 24 is curved at a constant curvature in the sub-scanning direction, the closer to the LED 98 alignment direction both ends, the more the light hits the exposure drum 24 at an angle and the greater the interval between the imagined spots. Accordingly, it is preferable to take the curvature of the exposure drum 24 into consideration as well, and to adjust the respective shapes and intervals of the holes and the LEDs in advance such that the imaged spots are aligned at equal intervals on the photosensitive material 18.

A diffusion plate 102 is fixed on (i.e., to the light emitting side of) the split plate 90. The light transmitted through the transmitting holes 92 is diffused by the diffusion plate 102 such that the light is made uniform at the light emitting region corresponding to the transmitting holes 92. For example, the fixing portion of a wire to the LED chip 96 creates a shadow with respect to the light from the LEDs 98, and the distribution of the intensity of the illuminated light is uneven. However, in this case as well, the unevenness is eliminated by the diffusion plate 102 so that uniform light is obtained within the light-emitting region.

At a light-exiting side If the diffusion plate 102, an ND filter 106 is fixed via a filter frame 104. The ND filter 106 adjusts the light irradiated from the LEDs 98 to become an intensity of light appropriate to the photos sensitive material 18.

The above-described protective frame 86, slit plate 90, diffusion plate 102 and filter frame 104 are fixed to the substrate 82R by means of screws. Of course, the structure for fixing the above members to the substrate 82 R is not limited to screws.

As shown in FIG. 2, in the casing 68, from the substrate 82R toward the exposure drum 24, a light intensity sensor 108 and an imaging lens 112 are provided in that order.

The light intensity senior 108 measures the intensity of light of the light emitted from the LEDs 98. On the basis of the measurement data, the controller 78 (see FIG. 2) adjusts the dispersion in the light intensity a the plural LEDs 98 and adjusts the increase/decrease in the light intensity accompanying changes over time, such that the respective LEDs 98 are controlled to always obtain the desired light intensity.

The imaging lens 112 is formed by one or plural lenses and a diaphragm. The focusing lens 112 moves in the direction of the optical axis by a magnification changing motor 114 (see FIG. 2) fixed to the casing 68. The imaging lens 112 gathers the light from the LEDs 98, and so as to form an image on the photosensitive material 18 trained around the exposure drum 24. The image forming magnification (1/k) can be changed by driving the imaging lens 112 in the direction of the optical axis by the magnification changing motor 114.

Next, operation of the image exposure apparatus 70 of the present embodiment will be described.

When an image signal corresponding to image information is inputted to the controller 78, the LEDs 98 are turned on. The positions of the lights from the LEDs 98 are corrected by the transmitting holes 92 in the slit plate 90 such that the lights are aligned on the photosensitive material 18 at equal intervals in the sub-scanning direction. Further, the lights from the LEDs 98 are made into uniform light in the light emission region by the diffusion plate 102,. Then, the intensity of light of the LEDs 98 is made appropriate to the photosensitive material 18 by the ND filter 10;.

Then, the controller 78 causes the stepping motor 76 to rotate in the forward direction so that the exposure head 26 moves along the shafts 64 in the main scanning direction. As a result, as shown by (1) in FIG. 4, the first main scanning is carried out at intervals of L×n (2L in FIG. 4 because n=2) between the adjacent main scanning lines S. Then, the controller 78 confirms the predetermined number of pulses, and thereafter, causes the photosensitive material 18 to be moved by L×m (5L in FIG. 4 because m=5) in the sub-scanning direction. After the photosensitive material 18 is stopped, the stepping motor 76 is rotated in the reverse direction so that the exposure head 26 is moved along the shafts 64 in the main scanning direction. As a result, the second main scanning is carried out as shown by (2). Thereafter, by carrying out the third and further main scannings in the same manner, the main scanning lines S from the fifth main scanning line are formed at fixed intervals L on the photosensitive material 18, to thereby form an image.

As is clear from the above description, since main scanning lines of the first and second main scans in the sub-scanning direction in the first main scanning have an interval of 2L therebetween, they do not contribute to the actual image formation. Accordingly, when the first main scanning is carried out, it is preferable to not irradiate light from light sources that correspond to the first and second main scanning lines in the sub-scanning direction.

At this point, as mentioned above, if the rotational center of the exposure drum 24 is slightly eccentric or the surface of the exposure drum 24 has minute indentations, the feed amounts of the photosensitive material 18 may not be constant and an error may be caused. Such an error may cause nonuniformity in the distribution of the intensity of light on the photosensitive material 18.

Figure 5:
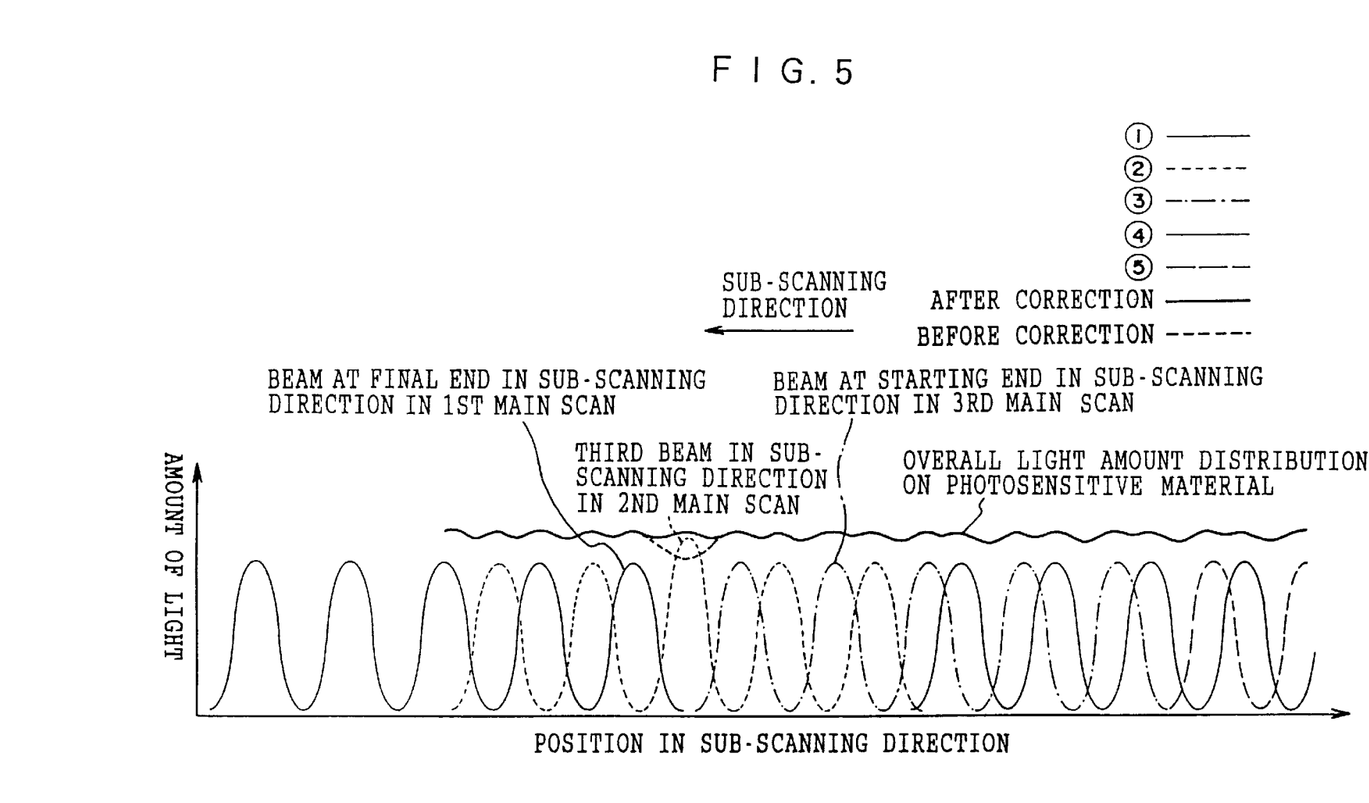
FIG. 5 is a graph illustrating light intensity distributions of beams that are main-scanned by the image exposure apparatus according to the first embodiment of the present invention.

For example, in contrast with the first main scanning, in the third main scanning, movement of the photosensitive material 18 in the sub-scanning direction has already been carried out twice. Therefore, properly speaking, in the third main scanning, the photosensitive 18 material 18 needs to be fed accurately by a feed amount of 10L (i.e., 5L×2). However, as shown in FIG. 5, in the third main scanning, for example, the feed amount may sometimes be slightly larger. In such a case, between a beam at the final en din the sub-scanning direction in the first main scan and a beam at the starting end in the sub-scanning direction in the third main scan, there is an interval larger than the predetermined line interval L. Accordingly, with respect to the overall light intensity distribution of the photosensitive material 18, the intensity of light is reduced locally at the above portion, as shown by the dashed line in FIG. 5.

On the other hand, in the image exposure apparatus 70 according to the present embodiment, information that such an interval as described above may be formed at the above-mentioned portion is stored in advance in the form of a correction table in the controller 78. Then when the second main scanning is carried out, the controller 78 controls the intensity of light of the LEDs 98 such that the intensity of light corresponding to the beam situated at the above portion (specifically, the third beam in the sub-scanning direction in the second main scan) is increased. As a result, as shown by the thick line in FIG. 5, a local reduction in the light intensity distribution is eliminated on the whole, thereby making it possible to obtain a uniform light intensity distribution.

In contrast, when the feed amount becomes slightly smaller in the third main scan, the beam at the final end in the sub-scanning direction in the first main scan and the beam at the starting end in the sub-scanning direction in the third main scan approach each other, thereby increasing the intensity of light locally at this portion. Even in such a case, however, the controller 78 controls the intensity of light of the LEDs 98 when the second main scanning is carried out such that the intensity of light corresponding to the bear situated at the above portion is reduced. As a result, a local in crease in the light intensity distribution is eliminated on the whole, thereby making it possible to obtain a uniform light intensity distribution.

As described above, in the method of controlling a light intensity in an image exposure apparatus according to the present embodiment, even when there is an error in a feed amount of the photosensitive material 18 in the sub-scanning direction, a uniform intensity of light can be obtained by correcting nonuniformity in the light intensity distribution which is caused by the error, thereby making it possible to form an image with high precision.

Figure 6:
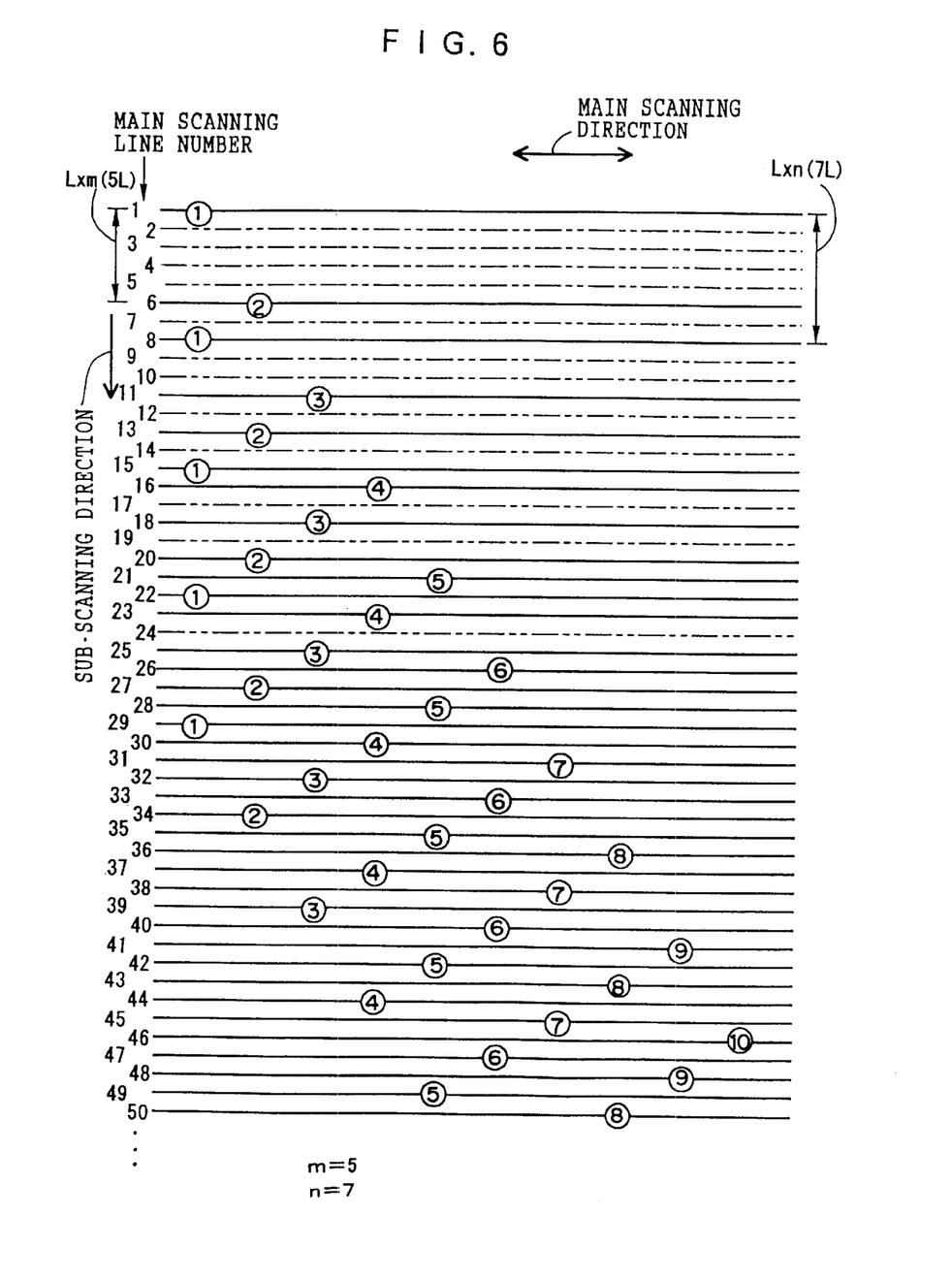
FIG. 6 is an explanatory view illustrating main scanning lines that are main-scanned by an image exposure apparatus according to a second embodiment of the present invention.

FIG. 6 shows main scanning lines which are exposed by an image exposure apparatus according to a second embodiment of the present invention. Conditions when exposure using comb light beam spots is carried out in the image exposure apparatus according to the second embodiment, which are different from those in the first embodiment, will only be described hereinafter, and a description of a specific structure of the image exposure apparatus will be omitted.

In the second embodiment predetermined natural number n and a number m of the LEDs 98 are set so as to satisfy the relation n>m≧2 and are relatively prime. In FIG. 6, for convenience of illustration, the number m of the LEDs 98 is 5 and the predetermined natural number n is 7.

A more specific description will be given with reference to FIG. 6. In FIG. 6, n is 7, and therefore, intervals of 7L are formed between the main scanning line S by the first main scan indicated by (1). Since m is 5, the photosensitive material 18 is moved by a distance of 5L in the sub-scanning direction and thereafter the second main scan is carried out as indicated by (2). As a result, in the interval having a length of 7L which has been formed between the main scanning lines S formed by the first main scan, a portion of the main scanning lines S formed by the second main scan is formed at position displaced in the sub-scanning direction by a distance of (5/7)L. The photosensitive material 18 is further moved by a distance of 5L in the sub-scanning direction, and thereafter, the third main scan is carried out as indicated by (3). As a result, in the intervals each having a length of 7L which have been formed between the main scanning lines S formed by the first main scan, a portion of the main scanning lines S formed by the third main scan is formed at a position displaced in the sub-scanning direction by a distance of (3/7)L from each of second and subsequent main scanning lines formed by the first main scan at a starting end in the sub-scanning direction (that is, man scanning lines of line numbers 8, 15, 22, . . . ). Thus, by carrying out main scanning plural times while moving the photosensitive material 18 in the sub-scanning direction by a distance of 5L for each main scan, the intervals of the main scanning lines are filled in successively, and an image in which intervals between the main scanning lines each become L is formed on the entire exposure surface. In FIG. 6, the intervals between the main scanning lines S from the line number 25 on are each L, which makes a contribution to actual image formation. It is preferable, in the same manner as in the first embodiment, that light is not emitted from a light source corresponding to a main scanning line which does not make a contribution to actual image formation.

In the manner described above, so-called exposure using comb light beam spots is carried out in the image exposure apparatus according to the second embodiment as well. For this reason, even when there is irregularity in the positions of the main scanning lines S (particularly in the positions in the sub-scanning direction), the irregularity can be corrected on the whole. Accordingly, it is possible to form an image with even higher precision.

In the image exposure apparatus according to the second embodiment of the present invention, in the same manner as in the image exposure apparatus 70 according to the first embodiment, even if there is a n error in the feed amount of the photosensitive material 18 (se FIG. 1), the intensities of light of the LEDs 98 (see FIG. 1) are controlled by the controller 78 (see FIG. 2) so as to eliminate the irregularity in the light intensity distribution on the photosensitive material 18. As a result, local reduction in a light intensity distribution is eliminated on the whole, thereby making it possible to obtain a uniform light intensity distribution.

Figure 7:
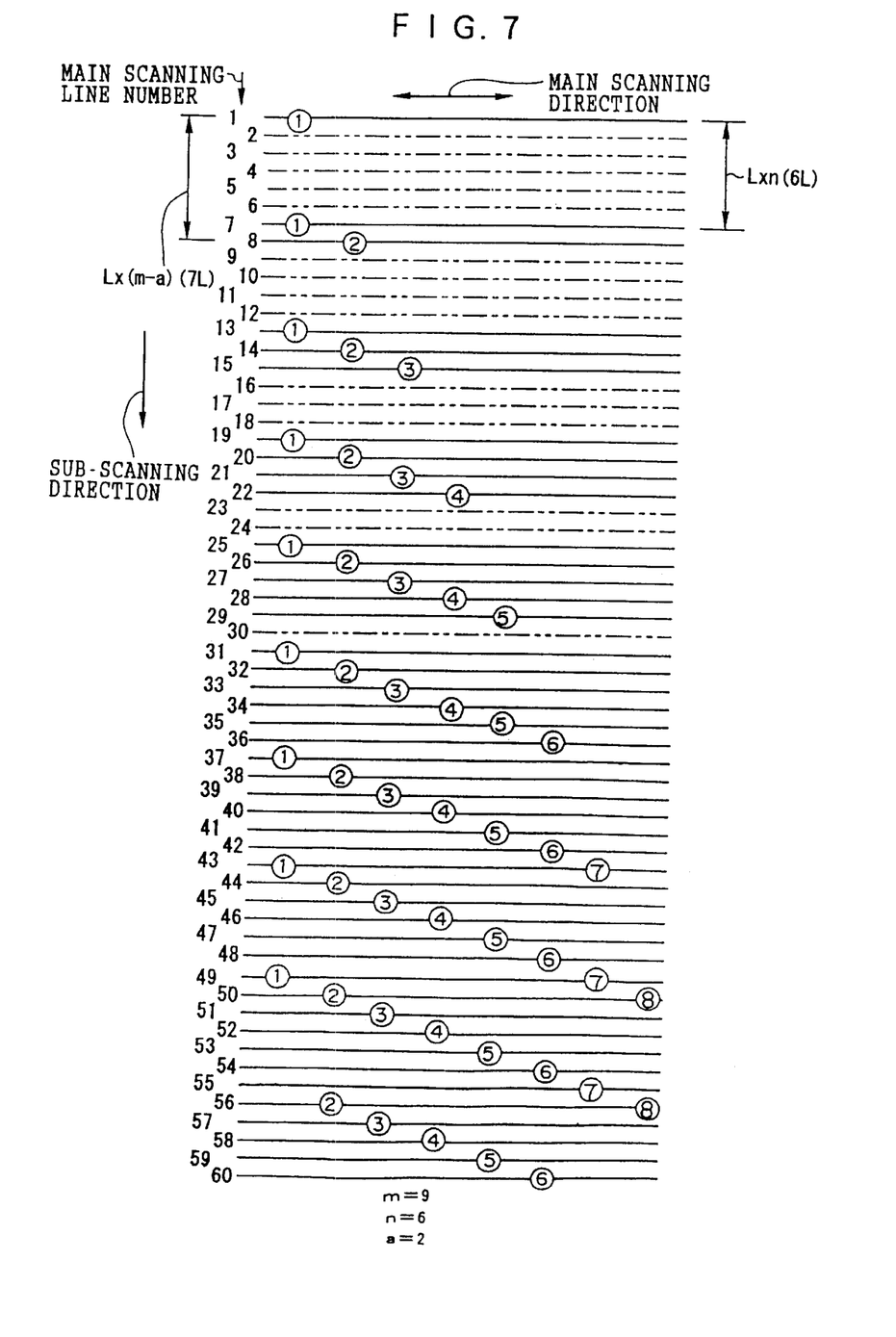
FIG. 7 is an explanatory view illustrating main scanning lines that are main-scanned by an image exposure apparatus according to a third embodiment of the present invention.

FIG. 7 shows main scanning lines which are exposed by an image exposure apparatus according to a third embodiment of the present invention. Conditions when exposure using comb light beam spots is carried out in the image exposure apparatus according to the third embodiment, which are different from those in the first and second embodiments, will only be described hereinafter, and a description of a specific structure of the image exposure apparatus will be omitted.

In the third embodiment, the predetermined natural number n and the number m of the LEDs 98 are not relatively prime, and "m−a" (a is a natural number) and n are relatively prime, and further, a predetermined natural number a is set so as to satisfy the relation, (m−a)≦(m×n)/2. The feed amount in the sub-scanning direction is (L×(m−a)). In FIG. 7, for convenience of illustration, the number m of the LEDs 98 is 9, the predetermined natural numbers n and a are 6 and 2, respectively.

A more specific description will be given with reference to FIG. 7. In FIG. 7, n is 6, and therefore intervals of 6L are formed between the main scanning lines S by the first main scan indicated by (1). Since m is 9 and a is 2, the photosensitive material 18 is moved by a distance of 7L in the sub-scanning direction and thereafter the second main scan is carried out as indicated by (2). As a result, in the intervals each having a length of 6L which have been formed between the main scanning lines S formed by the first main scan portion of the main scanning lines S formed by the second main scan is formed at a position displaced in the sub-scanning direction by a distance of (1/6) L from each of the second and subsequent main scanning lines formed by the first main scan at a starting end in the sub-scanning direction (that is, main scanning lines of line numbers 7, 13, 19, . . . ). The photosensitive material 18 is further moved by a distance of 7L in the sub-scanning direction, and thereafter, the third main scan is carried out as indicated by (3). As a result, in the intervals each having a length of 6L which have been formed between the main scanning lines S formed by the first main scan, a portion of the main scanning lines S formed by the third main scan is formed at a position displaced in the sub-scanning direction by a distance of (2/6) L from each of the third and subsequent main scanning lines formed by the first main scan at a starting end in the sub-scanning direction (that is, main scanning lines of line numbers, 13, 19, 25, . . . ). Thus, by successively carrying out main scans while moving the photosensitive material 18 in the sub-scanning direction by a distance of 7L for each main scan, the intervals between the main scanning lines are filled in successively and an image in which intervals between the main scanning lines are each L is formed on the entire exposure surface In FIG. 7, the intervals between the main scanning lines S from the line number 31 are each L, which makes a contribution to actual image formation. It is preferably, in the same manner as in the first embodiment, that light is not emitted from a light source corresponding to a main scanning line which does not make a contribution to actual image formation.

Further, a main scanning line S of a specified line number is resulting exposed by plural LESs 98 (see FIG. 3). For example, in FIG. 7, the 43-th main scanning line S and the 49-th main scanning line S are each exposed by the first and seventh main scans. Further, the 50-th main scanning line S and the 56-th main scanning line S are each exposed by the second and eighth main scans. In such cases, for example, the 43-th main scanning line S may be exposed by any one of the first and seventh main scans by the controller 78 selecting any LED 98. Alternatively, by controlling an intensity of light at main scan, the ratio in the light intensity between the LEDs 98 may be controlled so that an intensity of light required for obtaining a desired density can be obtained by carrying out exposure plural times. However, when one main scanning line is thus exposed plural times, there are cases in which a desired amount of exposure cannot be obtained due to so-called reciprocity even if the sum of intensities of light is fixed. Accordingly, it is preferable that the ratio in the light intensity between the LEDs 98 be controlled in consideration of reciprocity.

In the manner describe above, so-called exposure using comb light beam spots is carried out in the image exposure apparatus according to the third embodiment as well. For this reason, even when there is irregularity in the positions of the main scanning lines S (particularly in the positions in the sub-scanning direction), the irregularity can be corrected on the whole. Accordingly, it is Possible to form an image with even higher precision.

In the image exposure E apparatus according to the third embodiment of the present invention, in the same manner as in the image exposure apparatus 70 according to the first embodiment and the image exposure apparatus according to the second embodiment, even if there is an error in a feed amount of the photosensitive material 18 (see FIG. 1), the intensities of light of the LEDs 98 are controlled by the controller 78 so as to eliminate the irregularity in light intensity distribution on the photosensitive material 18. As a result, local reduction in a light intensity distribution is eliminated on the whole, thereby making it possible to obtain a uniform light intensity distribution.

Figure 8:
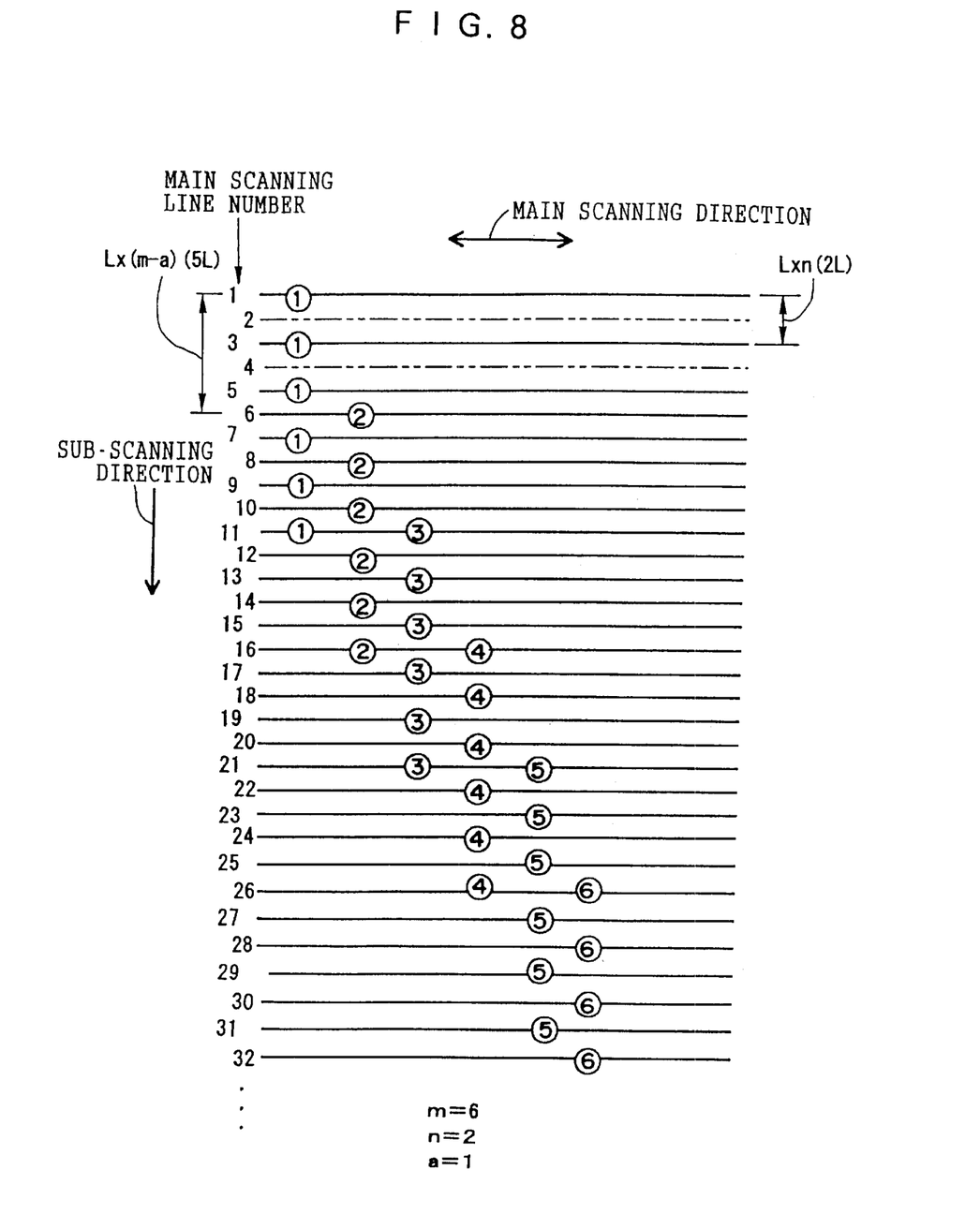
FIG. 8 is an explanatory view illustrating main scanning lines that are main-scanned by an image exposure apparatus according to a fourth embodiment of the present invention.

FIG. 8 shows main scanning lines which are exposed by an image exposure apparatus according to a fourth embodiment of the present invention. Conditions when exposure using comb light beam spots is carried out in the image exposure apparatus according to the fourth embodiment, which are different from those in the first and second embodiments, will merely be described hereinafter, and a description of a specific structure of the image exposure apparatus will be omitted.

In the fourth embodiment, in the same manner as in the third embodiment, the predetermined natural number n and the number m of the LEDs 98 are Lot relatively prime, and "m−a" (a is a natural number) and n are relatively prime, and further, a predetermined natural number a is set so as to satisfy the following relation (m−a)≦(m×n)/2. The feed amount in the sub-scanning direction is (L×(m−a)). In FIG. 8, for convenience of illustration, the number m of the LEDs 98 is 6, the predetermined natural numbers n and a are 2 and 1, respectively.

A more specific description will be given with reference to FIG. 8. In FIG. 8, n is 2, and therefore, intervals of 2L are formed between the main scanning lines S by the first main scan indicated by (1). Since m is 6 and a is 1, the photosensitive material 18 is moved by a distance of 5L in the sub-scanning direction, and thereafter, the second main scan is carried out as indicated by (2). As a result, a portion of the main scanning lines S formed by the second main scan is formed in the middle of each of the intervals of 2L, which intervals have been formed between the third and subsequent main scanning lines S formed by the first main scan at a starting end in the sub-scanning direction (that is, main scanning lines of line numbers 5, 7, 9, . . . ). The photosensitive material 18 is further moved by a distance of 5L in the sub-scanning direction, and thereafter, the third main scan is carried out as indicated by (3). As a result, a portion of the main scanning lines S formed by the third main scan is formed in the middle of each of the intervals of 2L, which intervals have been formed between the third and subsequent main scanning lines S formed by the second main scan at a starting end in the sub-scanning direction (that is main scanning lines of line numbers 10, 12, . . . ). Thus, by successively carrying out main scans while moving the photosensitive material 18 in the sub-scanning direction by a distance of 5L for each main scan, the intervals between the main scanning lines are successively filled in and an image in which intervals between the main scanning lines are each L is formed on the entire exposure surface. In FIG. 8, the intervals between the main scanning lines S from the line number 5 on are each L, which makes a contribution to actual image formation. It is preferably, in the same manner as in the first embodiment, that light is not emitted from a light source corresponding to a main scanning line which does not make a contribution to actual image formation.

Further, in the same manner as in the third embodiment, a main scanning line S of a specified line number is resulting exposed by a plurality of LEDs 98 (see FIG. 3). For example, in FIG. 8, the 11-th main scanning line S is exposed by the first and third main scans. In such a case, for example, the 11-th main scanning line S may be exposed by any one of the first and third main scans by the controller 78 selecting any LED 98. Alternatively, by controlling an intensity of light at main scan, the ratio in the light intensity between the LEDs 98 may be controlled so that an intensity of light required for obtaining a desired density can be obtained by carrying out exposure plural times. In this case, it is preferable that the ratio in the light intensity between the LEDs 98 be controlled in consideration of reciprocity.

In the manner describe above, so-called exposure using comb light beam spots is carried out in the image exposure apparatus according to the fourth embodiment as well. For this reason, even when there is irregularity in the positions of the main scanning lines S (particularly in the positions in the sub-scanning direction), the irregularity can be corrected on the whole. Accordingly, it is possible to form an image with even higher precision.

In the image exposure apparatus according to the fourth embodiment of the present invention as well, in the same manner as in the image exposure apparatus 70 according to the first embodiment and the image exposure apparatuses according to the second and third embodiments, even if there is an error in a feed amount of the photosensitive material 18 (see FIG. 1), the intensities of light of the LEDs 98 are controlled by the controller 78 so as to eliminate the irregularity in light intensity distribution on the photosensitive material 18. As a result, local reduction in a light intensity distribution is eliminated on the whole, thereby making it possible to obtain a uniform light intensity distribution.

The conditions when so called exposure using comb light beam spots is carried out are not limited to the above-described ones. Namely, as shown in the first and second embodiments, so long as m and n are relatively prime and the relation m, n≧2 is satisfied, an image can be form called exposure using comb light beam spots without he main scanning lines S overlapping each other and wit the lines to be main-scanned being main-scanned without fail. In this case, the condition of m and n may be set so as to satisfy the relation m>n≧2 in the same manner as in the first embodiment, or it may be set so as to satisfy the relation n>m≧2 in the same manner as in the second embodiment.

For example, in the first embodiment, when m is 31 as shown in FIG. 3, n can be 2.

Moreover, in the same way as in the third and fourth embodiments, the conditions may be set in such a manner that m and n are not relatively prime, and "m−a" (a is a natural number) and n is relatively prime, and predetermined natural number a satisfies the relation (m−a)≦(m×n)/2. In this case, by setting the feed amount in the sub-scanning direction so as to satisfy the relation (L×(m−a)), the exposure using comb light beam spots can be carried out.

Further, in the above description, the error in the feed amount of the photosensitive material 18 in the sub-scanning direction is recognized quantitatively by use of the correction table that is stored in the controller 78 in advance. However, the method of recognizing the error quantitatively is not necessarily limited to the same. For example, a sensor for detecting a feed amount of the photosensitive material 18 may be provided on the surface of the exposure drum 24, and the intensities of light of the LEDs 98 may be feedback-controlled on the basis of data detected by the sensor. However, when the error is recognized quantitatively by use of the correction table as described above, there is no need to provide such a sensor. Accordingly, the structure of the image exposure apparatus 70 is simplified and the control thereof is facilitated.

What is claimed is:

1. A method of controlling a light intensity in an image exposure apparatus comprising:
   providing light sources of a number m which emit light in accordance with image information, said light sources being aligned along a fixed direction so as to be disposed at intervals which are n times a line interval L which is a line interval between main scanning lines on an exposure surface, n being a natural number;
   carrying out main scanning by relatively moving the m light sources with respect to the exposure surface in a direction perpendicular to a direction in which the light sources are arranged;
   carrying out sub-scanning by relatively moving said exposure surface with respect to said m light sources in the direction in which the light sources are arranged by a feed amount of (L×m);
   determining an error in a feed amount of photosensitive material in a sub-scanning direction, said error causing an interval between specific main scanning lines to be larger or smaller than L; and
   controlling the light intensity of a light source among the m light sources during a main scan subsequent to said specific main scanning lines, said control corresponding to said error in said feed amount.

2. The method of controlling a light intensity in an image exposure apparatus according to claim 1, wherein m and n are relatively prime and are set so as to satisfy a relation m, n>2.

3. The method of controlling a light intensity in an image exposure apparatus according to claim 2, wherein when the main scanning lines approach each other due to the error, the intensity of light of a light source corresponding to a portion between the main scanning lines which approach each other is decreased.

4. The method of controlling a light intensity in an image exposure apparatus according to claim 3, wherein the image exposure apparatus comprises a memory in which the error is stored in advance in correspondence with the exposure surface and on a basis of the error that is stored in the memory, th,e intensity of light of a specific light source of the m light sources is controlled when sub-scanning is carried out.

5. The method of controlling a light intensity in an image exposure apparatus according to claim 2, wherein we the main scanning lines move away from each other due to the error, the intensity of light of a light source corresponding to a portion between the main scanning lines which move away from each other is increased.

6. The method of controlling a light intensity in an image exposure apparatus according to claim 5, wherein the image exposure apparatus comprises a memory in which the error is stored in advance in correspondence with the exposure surface and on a basis of the error that is stored in the memory, the intensity of light of a specific light source of the m light sources is controlled when sub-scanning is carried out.

7. The method of controlling a light intensity in an image exposure apparatus according to claim 2, wherein the image exposure apparatus comprises a memory in which the error is stored in advance in correspondence with the exposure surface and on a basis of the error that is stored in the memory, the intensity of light of a specific light source of the m light sources is controlled when sub-scanning is carried out.

8. The method of controlling a light intensity in an image exposure apparatus according to claim 1, wherein when the main scanning lines approach each other due to the error, the intensity of light of a light source corresponding to a portion between the main scanning lines which approach each other is decreased.

9. The method of controlling a light intensity in an image exposure apparatus according to claim 8, wherein the image exposure apparatus comprises a memory in which the error is stored in advance in correspondence with the exposure surface and on a basis of the error that is stored in the memory, the intensity of light of a specific light source of the m light sources is controlled when sub-scanning is carried out.

10. The method of controlling a light intensity in an image exposure apparatus according to claim 1, wherein when the main scanning lines move away from each other due to the error, the intensity of light of a light source corresponding to a portion between the main scanning lines which move away Tom each other is increased.

11. The method of controlling a light intensity in an image exposure apparatus according to claim 10, wherein the image exposure apparatus comprises a memory in which the error is stored in advance in correspondence with the exposure surface and on a basis of the error that is stored in the memory, the intensity of light of a specific light source of the m light sources is controlled when sub-scanning is carried out.

12. The method of controlling a light intensity in an image exposure apparatus according to claim 1, wherein the image exposure apparatus comprises a memory in which the error is stored in advance in correspondence with the exposure surface, and on a basis of the error that is stored in the memory, the intensity of light of a specific light source of the m light sources is controlled when sub-scanning is carried out.

13. The method according to claim 1, wherein said determining step includes monitoring a feed amount of said photosensitive material in the sub-scanning direction to detect said error.

14. The method according to claim 13, wherein said photosensitive material is disposed on an exposure drum, and said monitoring includes detecting said feed amount of said photosensitive material with a sensor on a surface of an exposure drum.

15. The method according to claim 1, wherein said determining step occurs prior to said specific main scanning lines and said error is pre-stored in a correction table.

16. The method according to claim 1, wherein said exposure surface comprises a drum, said method further comprising:

winding the photosensitive material around the drum prior to said main scanning, wherein said error in feed amount is caused by at least one of said drum being eccentric and one or more indentations on a surface of said drum, and main scanning is performed relative to the photosensitive material.

17. The method according to claim 1, wherein control of light intensity comprises control of light quantity per unit area.

18. The method according to claim 17, wherein said control of light intensity comprises controlling an optical characteristic of an activated light source.

19. A method of controlling a light intensity in an image exposure apparatus, comprising:

providing light sources of a umber m which emit light in accordance with image information, said light sources being aligned along a fixed direction so as to be disposed at intervals which are n times a line interval L which is a line interval between main scanning lines on an exposure surface, n being a natural number;

carrying out main scanning by relatively moving the m light sources with respect to the exposure surface in a direction perpendicular to the direction in which the light sources are arranged, carrying out sub-scanning by relatively moving the exposure surface with respect to the m light sources in the direction in which the light sources are arranged by a feed amount of $(L \times (m-a))$ (a is a natural number), m and n being not relatively prime and (m-a) and n being relatively prime, and satisfying the relation $m-a) \leq (m \times n)/2$;

determining an error in a feed amount of photosensitive material in a sub-scanning direction, said error causing an interval between specific main scanning lines to be larger or smaller than L;

controlling the light intensity of a light source among the m light sources during a main scan subsequent to said specific main scanning lines, said control corresponding to said error in said feed amount.

20. The method of controlling a light intensity in an image exposure apparatus according to claim 19, wherein when the main scanning lines approach each other due to the error, the intensity of light of a light source corresponding to a portion between the main scanning lines which approach each other is decreased.

21. The method of con trolling a light intensity in an image exposure apparatus according to claim 20, wherein the image exposure apparatus comprises a memory in which the error is stored in advance in correspondence with the exposure surface and on a basis of the error that is stored in the memory, the intensity of light of a specific light source of the m light sources is controlled when sub-scanning is carried out.

22. The method of controlling a light intensity in an image exposure apparatus according to claim 19, wherein when the main scanning lines move away from each other due to the error, the intensity of light of a light source corresponding to a portion between the main scanning lines which move away from each other is increased.

23. The method of controlling a light intensity in an image exposure apparatus according to claim 22, wherein the image exposure apparatus comprises a memory in which the error is stored in advance in correspondence with the exposure surface and on a basis of the error that is stored in the memory, th intensity of light of a specific light source of the m light sources is controlled when sub-scanning is carried out.

24. The method of controlling a light intensity in an image exposure apparatus according to claim 19, wherein the image exposure apparatus comprises a memory in which the error is stored in advance in correspondence with the exposure surface, and on a basis of the error that is stored in the memory, the intensity of light of a specific light source of the m light sources is controlled when sub-scanning is carried out.

25. The method according to claim 19, wherein said determining step includes monitoring a feed amount of said photosensitive material in the sub-scanning direction to detect said error.

26. The method according to claim 23, wherein said photosensitive material is disposed on an exposure drum, and said monitoring includes detecting said feed amount of said photosensitive material with a sensor on a surface of an exposure drum.

27. The method according to claim 19, wherein said determining step occurs prior to said specific main scanning lines and said error is pre-stored in a correction table.

28. The method according to claim 19, wherein said exposure surface comprises a drum, said method further comprising:

winding the photosensitive material around the drum prior to said main scanning, wherein said error in feed amount is caused by at least one of said drum being eccentric and one or more indentations on a surface of said drum, and main scanning is performed relative to the photosensitive material.

29. The method according to claim 19, wherein control of light intensity comprises control of light quantity per unit area.

30. The method according to claim 29, wherein control of light intensity comprises controlling an optical characteristic of an activated light source.

31. A method of controlling a light intensity in an image exposure apparatus comprising:

providing light sources of a n umber m which emit light in accordance with image information, said light sources being aligned along a fixed direction so as to be disposed at intervals which are n times a line interval L which is a line interval between main scanning lines on an exposure surface, n being a natural number;

carrying out main scanning by relatively moving the m light sources with respect to the exposure surface in a direction perpendicular to a direction in which the light sources are arranged;

carrying out sub-scanning by relatively moving said exposure surface with respect to said m light sources in the direction in which the light sources are arranged by a feed amount of $(L \times m)$;

determining an error in a feed amount of photosensitive material in a sub-scanning direction, said error causing an interval between specific main scanning lines to be larger or smaller than L; and controlling the light intensity of a light source among the m light sources during a main scan subsequent to determining said error in said feed amount related to the interval between said specific main scanning lines, said control corresponding to said error in said feed amount.

32. A method of controlling a light intensity in an image exposure apparatus, comprising:

providing light sources of a lumber m which emit light in accordance with image information, said light sources being aligned along a fixed direction so as to be disposed at intervals which are n times a line interval which is a line interval between main scanning lines on an exposure surface, n being a natural number;

carrying out main scanning by relatively moving the m light sources with respect to the exposure surface in a direction perpendicular to the direction in which the light sources are arranged, carrying out sub-scanning by relatively moving the exposure surface with respect to the m light sources in the direction in which the light sources are arranged by a feed amount of (L×(m−a)) (a is a natural number), m and n being not relatively prime and (m−a) and n being relatively prime, and satisfying the relation (m−a)≦(m×n)/2;

determining an error in a feed amount of photosensitive material in a sub-scanning direction, said error causing an interval between specific main scanning lines to be larger or smaller than L;

controlling the light intensity of a light source among the m light sources during a main scan subsequent to determining said error in said feed amount related to the interval between said specific main scanning lines, said control corresponding to said error in said feed amount.

* * * * *